(12) United States Patent
Paick

(10) Patent No.: US 10,083,692 B2
(45) Date of Patent: Sep. 25, 2018

(54) METHOD FOR PRODUCING AND RECOGNIZING BARCODE INFORMATION BASED ON VOICE, AND RECORDING MEDIUM

(71) Applicant: MTCOM CO., LTD., Gyeonggi-do (KR)

(72) Inventor: Seung Bin Paick, Gyeonggi-do (KR)

(73) Assignee: MTCOM CO., LTD, Pangyo-Ro, Bundang-Gu, Seongnam-si, Gyeonggi-Do (KR)

( * ) Notice: Subject to any disclaimer, the term of this patent is extended or adjusted under 35 U.S.C. 154(b) by 0 days.

(21) Appl. No.: 14/910,518

(22) PCT Filed: Dec. 31, 2013

(86) PCT No.: PCT/KR2013/012418
§ 371 (c)(1),
(2) Date: Feb. 5, 2016

(87) PCT Pub. No.: WO2015/020285
PCT Pub. Date: Feb. 12, 2015

(65) Prior Publication Data
US 2016/0180849 A1    Jun. 23, 2016

(30) Foreign Application Priority Data
Aug. 7, 2013  (KR) .................. 10-2013-0093846

(51) Int. Cl.
*G09B 5/06*      (2006.01)
*G10L 15/26*    (2006.01)
(Continued)

(52) U.S. Cl.
CPC ........ *G10L 15/265* (2013.01); *G06K 19/0614* (2013.01); *G06T 1/005* (2013.01);
(Continued)

(58) Field of Classification Search
CPC . G06F 17/30879; G06F 17/275; G06K 1/121; G09B 5/06; H04L 29/06027
USPC .................. 704/272; 382/181; 235/375, 456
See application file for complete search history.

(56) References Cited

U.S. PATENT DOCUMENTS 6,115,508 A * 9/2000 Lopresti ................. G06K 1/121
235/456
6,548,768 B1 * 4/2003 Pettersson ........... G06F 3/03545
178/18.01

(Continued)

FOREIGN PATENT DOCUMENTS

| KR | 200287162 Y1 | 8/2002 |
|---|---|---|
| KR | 1020090048211 A | 5/2009 |
| WO | 0245051 A1 | 6/2002 |

OTHER PUBLICATIONS

PCT International Search Report, PCT/KR2013/012418, dated May 14, 2014.

*Primary Examiner* — Seong Ah A Shin
(74) *Attorney, Agent, or Firm* — Chris A. Watt; Yakov Sidorin; Quarles & Brady LLP

(57) ABSTRACT

The specification discloses a method of generating and recognizing voice based playback information, and a recording medium for storing instructions for performing the method. That is, a voice playback file for outputting voice is converted to playback information, and the voice is outputted by playing back the voice playback file, when the playback information is recognized. Thus, a recording function, which can be utilized in various fields, can be provided without using a separate storage for storing the voice playback file.

6 Claims, 5 Drawing Sheets

(51) Int. Cl.

| | |
|---|---|
| *G11B 27/031* | (2006.01) |
| *G06K 19/06* | (2006.01) |
| *G06T 1/00* | (2006.01) |
| *G10L 21/10* | (2013.01) |
| *G10L 21/18* | (2013.01) |

(52) U.S. Cl.
CPC .............. *G10L 21/10* (2013.01); *G10L 21/18* (2013.01); *G11B 27/031* (2013.01); *G06T 2201/0062* (2013.01)

(56) References Cited

U.S. PATENT DOCUMENTS

| | | | | |
|---|---|---|---|---|
| 2003/0101058 A1* | 5/2003 | Liou | ................ | G09B 5/06 704/272 |
| 2003/0175673 A1* | 9/2003 | Lee | ................ | G09B 5/04 434/319 |
| 2006/0007921 A1* | 1/2006 | Shimomura | ...... | H04L 29/06027 370/352 |
| 2006/0285748 A1* | 12/2006 | Tateno | ................ | G06F 17/275 382/181 |
| 2007/0127085 A1* | 6/2007 | Mori | ................ | H04N 1/2166 358/403 |
| 2008/0192291 A1* | 8/2008 | Honda | ............. | G06F 17/30876 358/1.15 |
| 2008/0225334 A1* | 9/2008 | Hamada | ................ | G06F 3/1205 358/1.15 |
| 2009/0128520 A1* | 5/2009 | Combe | ............... | G06F 3/03545 345/179 |
| 2009/0161149 A1* | 6/2009 | Noguchi | ............ | H04N 1/00334 358/1.15 |
| 2010/0067807 A1* | 3/2010 | Kim | ................ | G07D 7/0047 382/218 |
| 2010/0195142 A1* | 8/2010 | Watanabe | ............. | G06F 3/1203 358/1.15 |
| 2014/0160009 A1* | 6/2014 | Hendrickson | ......... | G06F 3/0317 345/156 |
| 2014/0339296 A1* | 11/2014 | McAdams | ........ | G06F 17/30879 235/375 |
| 2015/0014417 A1* | 1/2015 | Finlow-Bates | ...... | G06K 7/1447 235/462.41 |

* cited by examiner

[Figure 1]
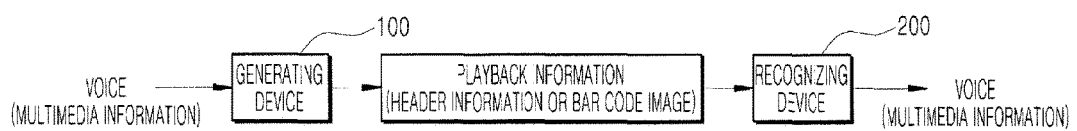

【Figure 2】
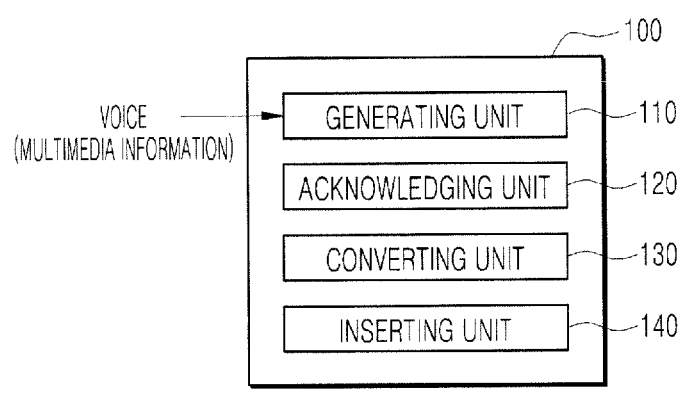

[Figure 3]
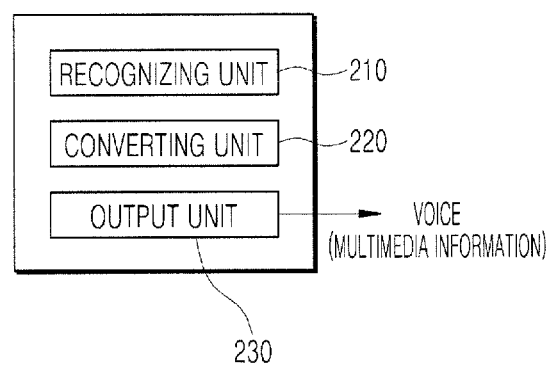

[Figure 4]
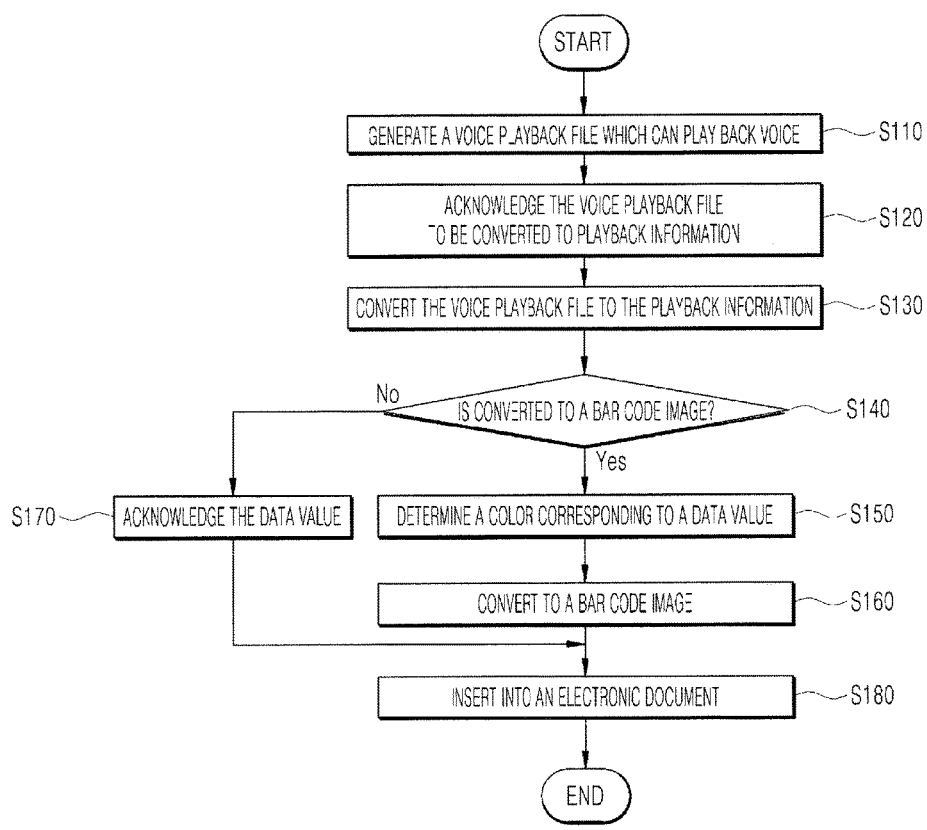

[Figure 5]
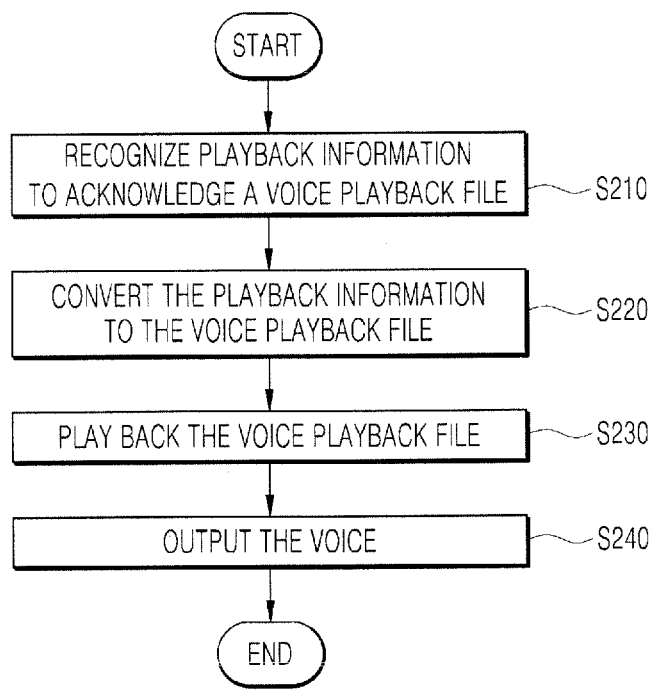

METHOD FOR PRODUCING AND RECOGNIZING BARCODE INFORMATION BASED ON VOICE, AND RECORDING MEDIUM

CROSS-REFERENCE TO RELATED APPLICATIONS

This application represents the national stage entry of PCT International Application No. PCT/KR2013/012418 filed Dec. 31, 2013, which claims priority of Korean Patent Application No. 10-2013-0093846 filed Aug. 7, 2013, the disclosures of which are incorporated by reference here in their entirety for all purposes.

TECHNICAL FIELD

The present invention relates to a method for converting a voice playback file for outputting voice to playback information, and playing back the voice playback file when the playback information is recognized, to output the voice.

BACKGROUND ART

As a sales amount and use of a potable electronic device (e.g. a smart pad) greatly increase year by year, an electronic document and an electronic signature service have been introduced to be used in various fields.

Furthermore, the electronic document and electronic signature services are promoted by a paperless plan made by government, which results in a rapidly increasing trend.

In recent days, in relation to legislation of the electronic signature, a recording function is introduced as a means for supplementing the legal effectiveness of the electronic signature, and there is an increasing need for fundamentally preventing a customer from denying contract content or consent content.

Since this recording function can be widely utilized in various fields all over the society, not only as a supplementary means for reinforcing the legal effectiveness of the electronic signature, a method for utilizing the recording function in an active manner is required.

DISCLOSURE

Technical Problem

The present invention has been envisaged by considering the context described in the above, and an objective to be obtained by the present invention is to provide a recording function, which can be utilized in various fields without using a separate storage for storing the voice playback file by converting a voice playback file for outputting voice to playback information, and outputting the voice by playing back the voice playback file, when the playback information is recognized.

Technical Solution

A method of generating voice based playback information according to a first aspect of the present invention is characterized in comprising: an acknowledging step in which a voice playback file, which has been generated to be played back to output voice, is acknowledged; and a converting step in which the voice playback file is converted to playback information, such that, when the playback information is recognized, the voice playback file, which has been converted to the playback information, is played back.

More specifically, the method is characterized in further comprising: an inserting step in which the playback information is inserted as header information for a specific electronic document, or the playback information is converted to a bar code image and inserted in the electronic document.

More specifically, data values of respective data, which constitute the voice playback file, are included in the playback information, and wherein, in the inserting step, the playback information is converted to a bar code image, such that the bar code image includes data identifiers which are determined by the data values of the respective data which constitute the voice playback file, and then the bar code image is inserted to the electronic document.

More specifically, the data identifier is determined such that it includes at least one of two or more colors and figures which correspond to the data values of the respective data.

More specifically, in the converting step, the voice playback file as well as a multimedia information playback file, which is a playback file for outputting multimedia information related to the voice, are converted to the playback information, and wherein, the multimedia information includes at least one of a text, an image, and a moving image which are related to the voice.

A method of recognizing voice based playback information according to a second aspect of the present invention is characterized in comprising: a recognizing step in which playback information, which has been converted from a voice playback file, is recognized, wherein the voice playback file is a playback file for outputting voice; a converting step in which the recognized playback information is converted to the voice playback file; and an outputting step in which the converted voice playback file is played back to output the voice.

More specifically, in the recognizing step, the playback information, which has been inserted as head information for an electronic document, is recognized, or the playback information, which has been converted to a bar code image and inserted to the electronic document, is recognized.

More specifically, data values of respective data, which constitute the voice playback file, are included in the playback information, and, in the recognizing step, a data identifier, which is determined by the data values of the respective data which constitute the voice playback file, is recognized from the bar code image.

More specifically, the data identifier is determined such that it includes at least one of two or more colors and figures which correspond to the data values of the respective data.

More specifically, the recognized playback information is converted to a multimedia information playback file for outputting multimedia information related to the voice as well as the voice playback file, and, in the outputting step, at least one of a text, an image, and a moving image which are related to the voice is outputted as the multimedia information.

Advantageous Effects

According to the method of generating and recognizing a voice playback file for outputting voice, and a recording medium for storing instructions for performing the method, a voice playback file for outputting voice is converted to playback information, and the voice is outputted by playing back the voice playback file, when the playback information is recognized. Thus, a recording function, which can be utilized in various fields, can be provided without using a separate storage for storing the voice playback file in addition to serving as a means for supplementing the legal effectiveness of an electronic signature.

DESCRIPTION OF DRAWINGS

FIG. 1 is a schematical configuration diagram of a system for generating and recognizing playback information based on voice according to an embodiment of the present invention;

FIG. 2 is a schematical configuration diagram of a generating device according to an embodiment of the present invention;

FIG. 3 is a schematical configuration diagram of a recognizing device according to an embodiment of the present invention;

FIG. 4 is a schematical flowchart for illustrating an operation flow of a generating device according to another embodiment of the present invention; and FIG. 5 is a schematical flowchart for illustrating an operation flow of a recognizing device according to a still another embodiment of the present invention.

BEST MODE

Here, one embodiment of the present invention is described by referring to the appended figures.

FIG. 1 is a schematical configuration diagram of a system for generating and searching for playback information based on voice according to an embodiment of the present invention.

As shown in FIG. 1, the system for generating and searching for playback information based on voice hardware according to an embodiment of the present invention can have a generating device 100 for generating voice based playback information and a recognizing device 200 for recognizing the generated playback information.

Here, the generating device 100 refers to a device which converts a voice playback file, which has been generated for outputting voice, to playback information.

Such a generating device 100 can convert the voice playback file to the playback information by way of a series of processes performing an application or a programmed software module.

Therefore, the generating device 100 refers to a user device which is capable of executing an application or a software module.

For example, the generating device 100 can include a smartphone, a personal computer (PC), a notebook, a tablet PC, and a personal digital assistant (PDA), etc.

And, the recognizing device 200 refers to a device which recognizes the playback information, which has been converted from the voice playback file, and plays back the voice playback file, which has been converted to the playback information, and outputs the voice.

Like the generating device 100 which has been mentioned in the above, such recognizing device 200 can convert the voice playback file to the playback information by way of a series of processes performing an application or a programmed software module.

Therefore, the recognizing device 200 also refers to a user device which is capable of executing an application or a software module.

Meanwhile, there is proposed a recording function which can be widely utilized in various fields all over the society, not only as a supplementary means for reinforcing the legal effectiveness of the electronic signature.

According to the prior art, however, a separate storage (e.g. compact disk (CDCD), universal serial bus (USB)) needs to be introduced for storing the voice function in order to implement the recording function, and the voice is conventionally recorded as voice data.

As a result, the recording storage needs to be managed as a separate module, and a playback device needs to read the recorded voice data from the storage voice and output the voice, which is inconvenient to users.

Therefore, according to an embodiment of the present invention, there is proposed a method for converting a voice playback file for outputting voice to playback information, and outputting the playback information when the playback information is recognized, and the method will be explained in detail in the following.

At first, the generating device 100 performs a function of generating the voice playback file.

More specifically, the generating device 100 converts the voice to a voice playback file which can be played back, such that the voice can be outputted when the recognizing device 200 or a separate playback device (not shown) plays back the voice playback file.

Also, the generating device 100 performs a function of acknowledging the voice playback file to be converted to the playback information.

More specifically, the generating device 100 can acknowledge a voice playback file, which was generated on its own, as a target to be converted to the playback information, or a voice playback file, which was generated by the separate device, as a target to be converted to the playback information.

Also, the generating device 100 performs a function of converting the voice playback file to the playback information.

More specifically, when the voice playback file, which is to be converted to the playback information, is acknowledged, the generating device 100 converts the corresponding voice playback file to the playback information, such that the converted voice playback file is played back to output the voice, when the playback information is recognized by the recognizing device 200.

In the meantime, the generating device 100 performs the conversion in a way that data values of respective data, which constitute the voice playback file, are included in the playback information, such that the playback information is inserted as head information for an electronic document, or the playback information is converted to a bar code image and inserted to the electronic document.

Also, the generating device 100 performs a function of inserting the playback information, which has been converted from the voice playback file, to the electronic document.

More specifically, the generating device 100 enables the recognizing device 200 to recognize the corresponding playback information and output the voice by inserting the playback information, which has been converted from the voice playback file, as the head information for the electronic document or converting the playback information to the bar code image and inserting the bar code image into the electronic document.

The recognizing device 200 performs a function of recognizing the playback information.

More specifically, the recognizing device 200 acknowledges that there exists the voice playback file, which has been converted to the playback information, by recognizing the playback information which has been inserted as the head information for the electronic document or converted to a bar code image and inserted in the electronic document.

In the meantime, when the recognizing device 200 recognizes the playback information which has been inserted as the bar code image, it can acknowledge that the voice playback file, which has been converted to the playback information, exists by recognizing various colors and figures which are applied to the bar code image as data identifiers.

Also, the recognizing device 200 performs a function of converting the playback information to the voice playback file.

More specifically, when the recognizing device 200 acknowledges the voice playback file, which has been converted to the playback information, it converts the playback information back to the voice playback file.

In the meantime, the recognizing device 200 can perform the conversion to the voice playback file by replacing a recognition result obtained by recognizing data identifiers (e.g. colors, figures) inserted into the bar code image with data values of the respective data constituting the voice playback file.

Also, the service device 200 performs a function of playing back the voice playback file.

More specifically, when the conversion from the playback information to the voice playback file is completed, the recognizing device 200 outputs the voice by playing back the converted voice playback file.

In the meantime, when the voice playback file as well as a multimedia information playback file are converted from the playback information, the recognizing device 200 outputs not only the voice but multimedia information such as a text, an image, and a moving image, etc. which are related to the voice, etc.

In the following, the configuration of the generating device 100 according to an embodiment of the present invention will be explained in detail by referring to FIG. 2.

That is, the generating device 100 has a configuration including a generating unit 110 for generating the voice playback file, an acknowledging unit 120 for acknowledging the voice playback file to be converted to the playback information, and a converting unit 130 for converting the voice playback file to the playback information.

Also, the generating device 100 according to an embodiment of the present invention can have the configuration which, in addition to the aforementioned configuration, further includes an inserting unit 140 which inserts the converted playback information to an electronic document.

Here, the respective components of the generating device 100 including the aforementioned generating unit 110, the acknowledging unit 120, the converting unit 130, and the inserting unit 140 can be implemented as an application or a programmed software module which is executed by a processor.

The generating unit 110 performs a function of generating a voice playback file.

More specifically, the generating unit 110 converts the voice to a voice playback file which can be played back, such that the voice can be outputted when the recognizing device 200 or a separate playback device (not shown) plays back the voice playback file.

For example, when negotiating on a contract or a consent in hospitals, insurance/financial companies, magazine companies, etc., the generating unit 110 can generate the voice playback file by using the voice of a contractor or a consenter in order to prevent legal disputes.

As another example, publishing companies, music companies, etc. can generate the voice playback file by using the voice of a popular author, a celebrity, or a voice actor, etc. in order to promote the sales of a publication or a copyrighted work.

In addition to these, in various services (e.g. study materials, foreign language materials, etc.), the voice playback file can be generated by using the voice for describing a word or a sentence, announcing pronunciations, and explaining a solution to a problem, etc.

Also, the acknowledging unit 120 performs a function of acknowledging the voice playback file to be converted to the playback information.

More specifically, the acknowledging unit 120 can acknowledge a voice playback file, which was generated on its own, as a target to be converted to the playback information, or a voice playback file, which was generated by the separate device, as a target to be converted to the playback information.

The converting unit 130 performs a function of converting the voice playback file to the playback information.

More specifically, when the voice playback file, which is to be converted to the playback information, is acknowledged, the converting unit 130 converts the corresponding voice playback file to the playback information, such that the converted voice playback file is played back to output the voice, when the playback information is recognized by the recognizing device 200.

In the meantime, the converting unit 130 performs the conversion in a way that data values of respective data, which constitute the voice playback file, are included in the playback information, such that the playback information is inserted as head information for an electronic document, or the playback information is converted to a bar code image and inserted in the electronic document in the determining unit 240.

Meanwhile, while converting the voice playback file to the playback information, the converting unit 130 can convert the voice playback file as well as the multimedia information playback file, which is a playback file for outputting multimedia information related to the voice, to the playback information.

Here, the multimedia information can include, for example, a text, an image, a moving image, etc.

Here, when the recognizing device 200 acknowledges the playback information, the multimedia information such as the text, the image, and the moving image, etc. which are related to the voice can be outputted along with the voice.

The inserting unit 140 performs a function of inserting the playback information, which has been converted from the voice playback file, to the electronic document.

More specifically, the inserting unit 140 enables the recognizing device 200 to recognize the corresponding playback information and output the voice by inserting the playback information, which has been converted from the voice playback file, as the head information for the electronic document or converting the playback information to the bar code image and inserting the bar code image into the electronic document.

That is, the inserting unit 140 inserts the playback information, which has been converted from the voice playback file, as the head information for the electronic document, such that the recognizing device 200 can recognize the playback information, which has been inserted as the head information, when browsing the electronic document, and output the voice.

Here, when the playback information, which has been inserted as the head information for the electronic document, is recognized, it can be recognized by way of various events (e.g.: a clock on a specific region on the document, a drag, etc.) which are performed while browsing the electronic document.

And, it can be apparent to a person with an ordinary skill in the art that, when the corresponding electronic document is printed, the playback information, which has been inserted as the head information for the electronic document, can be converted to as a bar code image on a printout of the corresponding electronic document and then outputted.

Also, the inserting unit 140 enables the recognizing device 200 to recognize the bar code image, which has been inserted into the electronic document, and output the voice by inserting the playback information, which has been converted from the voice playback file, as the head information for the electronic document to the bar code image and inserting the bar code image into the electronic document.

In the meantime, the inserting unit 140 determines data identifiers, which correspond to data values of the respective data, and configures the bar code image such that includes the determined data identifiers.

Here, the inserting unit 140 determines various colors or figures, which correspond to the data values of the respective data, as the data identifiers and configures the bar code image by using the determined data identifiers.

For example, when a plurality of colors are determined as the data identifiers, each of the colors applied to the bar code image can represent the data values of the respective data which configure the voice playback file by, for example, determining color components such as concentration, saturation, and brightness.

As another example, when the figures are determined as the data identifiers, the data values of the respective data which configure the voice playback file, can be represented by determining shapes, combinations, sizes, etc.

Like this, the playback information can be inserted as the head information for the electronic document or the bar code image, such that the playback information can be widely used in various applications all over the society.

For example, when negotiating on a contract or a consent in hospitals, insurance/financial companies, magazine companies, etc., the inserting unit 140 can insert the playback information, which has been converted from the voice playback file, on the electronic document or the printout, such that the recognizing device 200, which recognizes the inserted playback information, can output the voice of a contractor or a consenter, thereby enabling the voice to be used as a legally forceful countermeasure against denial.

As another example, publishing companies, music companies, etc. can insert the playback information, which has been converted from the voice playback file, to a publication or a copyrighted work, such that the recognizing device 200, which recognizes the playback information, can output the voice of a popular author, a celebrity, or a voice actor, etc. and use the voice as a brand new promotion means.

Also in the education field, the playback information can be inserted into web pages or printouts, etc. which are related to various services (e.g. study materials, foreign language materials, etc.), such that the recognizing device 200, which recognizes the playback information, can output the voice for describing a word or a sentence, announcing pronunciations, and explaining a solution to a problem, etc., and use the voice as an educating means.

In the following, the configuration of the recognizing device 200 according to an embodiment of the present invention will be explained in detail by referring to FIG. 3.

That is, the recognizing device 200 has a configuration including a recognizing unit 210 for recognizing the playback information, a converting unit 220 for converting the recognized playback information to the voice playback file, and an output unit 230 for playing back the voice playback file to output the voice.

Here, the respective components of the recognizing device 200 including the recognizing unit 210, the converting unit 220, and the output unit 230 can be implemented as an application or a programmed software module which is executed by a processor.

The recognizing unit 210 performs a function of recognizing the playback information.

More specifically, the recognizing unit 210 acknowledges that there exists the voice playback file, which has been converted to the playback information, by recognizing the playback information which has been inserted as the head information for the electronic document or converted to a bar code image and inserted in the electronic document.

In the meantime, when recognizing unit 210 recognizes the playback information which has been inserted as the bar code image, it can acknowledge that the voice playback file, which has been converted to the playback information, exists by recognizing various colors and shapes which are applied to the bar code image as data identifiers.

The converting unit 220 performs a function of converting the playback information to the voice playback file.

More specifically, when the voice playback file, which has been converted to the playback information, is acknowledged, the converting unit 220 it converts the playback information back to the voice playback file.

For example, when a plurality of colors are applied in the bar code image as the data identifiers, the converting unit 220 can perform the conversion to the voice playback file by acknowledging color components of each of the colors such as concentration, saturation, and brightness, etc., and replacing the acknowledged result with the data values of the respective data which configure the voice playback file.

As another example, when figures are applied as the data identifiers included in the bar code image, the converting unit 220 can perform the conversion to the voice playback file by acknowledging shapes, combinations, sizes, etc. of the figures and replacing the acknowledged result with the data values of the respective data which configure the voice playback file.

The output unit 230 performs a function of playing back the voice playback file.

More specifically, when the conversion from the playback information to the voice playback file is completed, the output unit 230 outputs the voice by playing back the converted voice playback file.

In the meantime, when the voice playback file as well as a multimedia information playback file are converted from the playback information, the recognizing device 200 outputs not only the voice but multimedia information such as a text, an image, and a moving image, etc. which are related to the voice, etc.

Like this, the output unit 230 can play back the voice playback file, which has been converted from the playback information, such that the voice is outputted widely used in various applications all over the society.

For example, when negotiating on a contract or a consent in hospitals, insurance/financial companies, and magazine companies, etc., and the playback information, which has been inserted into the electronic document or a printout is recognized, the voice of a contractor or a consenter can be outputted, thereby enabling the voice to be used as a legally forceful countermeasure against denial.

As another example, when publishing companies, music companies, etc. recognize the playback information, which has been inserted into the publication or the copyrighted work, the voice of a popular author, a celebrity, or a voice actor, etc. can be outputted and used as a brand new promotion means.

Also in the education field, when the playback information, which is inserted in association with various services (e.g. study materials, foreign language materials, etc.), is recognized, the voice for describing a word or a sentence, announcing pronunciations, and explaining a solution to a problem, etc. can be outputted and used as an educating means.

As mentioned in the above, according to a system for generating and recognizing a voice based playback information, the voice playback file for outputting voice is converted to the playback information, and the voice is outputted by playing back the voice playback file, when the playback information is recognized. Thus, a recording function, which can be utilized in various fields, can be provided without using a separate storage for storing the voice playback file in addition to serving as a means for supplementing the legal effectiveness of an electronic signature.

In the following, a method of generating and recognizing voice based playback information according to an embodiment of the present invention will be explained by referring to FIGS. 4 and 5.

Here, the configurations described in the FIG. 1 and FIG. 2 are referred to by using corresponding reference numbers for the convenience of description.

At first, an operation flow of a generating device 100 according to an embodiment of the present invention will be explained as follows by referring to FIG. 4.

As starters, the generating unit 110 converts voice to a voice playback file which can be played back, such that the voice can be outputted when the recognizing device 200 or a separate playback device (not shown) plays back the voice playback file (S110).

Then the acknowledging unit 120 acknowledges a voice playback file, which was generated on its own, as a target to be converted to the playback information, or a voice playback file, which was generated by the separate device, as a target to be converted to the playback information (S120).

Then, when the voice playback file, which is to be converted to the playback information, is acknowledged, the converting unit 130 converts the corresponding voice playback file to the playback information, such that the converted voice playback file is played back to output the voice, when the playback information is recognized by the recognizing device 200 (S130).

In the meantime, the converting unit 130 performs the conversion in a way that data values of respective data, which constitute the voice playback file, are included in the playback information, such that the playback information is inserted as head information for an electronic document, or the playback information is converted to a bar code image and inserted to the electronic document in the determining unit 240.

Meanwhile, while converting the voice playback file to the playback information, the converting unit 130 can convert the voice playback file as well as the multimedia information playback file, which is a playback file for outputting multimedia information related to the voice, to the playback information.

Then, the inserting unit 140 enables the recognizing device 200 to recognize the bar code image, which has been inserted into the electronic document, and output the voice by inserting the playback information, which has been converted from the voice playback file, as the head information for the electronic document to the bar code image and inserting the bar code image into the electronic document (S140-S160, S180).

In the meantime, the inserting unit 140 determines various colors or shapes, which correspond to the data values of the respective data, as the data identifiers and configures the bar code image by using the determined data identifiers.

For example, when a plurality of colors are determined as the data identifiers, each of the colors applied to the bar code image can represent the data values of the respective data which configure the voice playback file by, for example, determining color components such as concentration, saturation, and brightness.

As another example, when the figures are determined as the data identifiers, the data values of the respective data which configure the voice playback file, can be represented by determining shapes, combinations, sizes, etc.

In the meantime, the inserting unit 140 inserts the playback information, which has been converted from the voice playback file, as the head information for the electronic document, such that the recognizing device 200 can recognize the playback information, which has been inserted as the head information, when browsing the electronic document, and output the voice (S170-S180).

In the following, an operation flow of a recognizing device 200 according to an embodiment of the present invention will be explained as follows by referring to FIG. 5.

At first, the recognizing unit 210 acknowledges that there exists the voice playback file, which has been converted to the playback information, by recognizing the playback information which has been inserted as the head information for the electronic document or converted to a bar code image and inserted in the electronic document (S210).

In the meantime, when recognizing unit 210 recognizes the playback information which has been inserted as the bar code image, it can acknowledge that the voice playback file, which has been converted to the playback information, exists by recognizing various colors and shapes which are applied to the bar code image as data identifiers.

Then, when the voice playback file, which has been converted to the playback information, is acknowledged, the converting unit 220 it converts the playback information back to the voice playback file (S220).

In the meantime, when a plurality of colors are applied in the bar code image as the data identifiers, the converting unit 220 can perform the conversion to the voice playback file by acknowledging color components of each of the colors such as concentration, saturation, and brightness, etc., and replacing the acknowledged result with the data values of the respective data which configure the voice playback file.

And, when figures are applied as the data identifiers included in the bar code image, the converting unit 220 can perform the conversion to the voice playback file by acknowledging shapes, combinations, sizes, etc. of the figures and replacing the acknowledged result with the data values of the respective data which configure the voice playback file.

Then, when the conversion from the playback information to the voice playback file is completed, the output unit 230 outputs the voice by playing back the converted voice playback file (S240).

In the meantime, when a voice playback file as well as a multimedia information playback file are converted from the playback information, the recognizing device 200 outputs not only the voice but also the multimedia information such as a text, an image, and a moving image, etc. which are related to the voice, etc.

As mentioned in the above, according to a method for generating and recognizing a voice based playback information, the voice playback file for outputting voice is converted to the playback information, and the voice is outputted by playing back the voice playback file, when the playback information is recognized. Thus, a recording function, which can be utilized in various fields, can be provided without using a separate storage for storing the voice playback file in addition to serving as a means for supplementing the legal effectiveness of an electronic signature.

Meanwhile, the method and algorithm steps which are described in relation to the embodiments disclosed herein can be implemented directly as hardware, as a software module executed by a processor, or as a combination of the hardware and the software module. The software module may reside in RAM memory, flash memory, ROM memory, EPROM memory, EEPROM memory, registers, a hard disk, a removable disk, a CD-ROM, or any other form of storage medium known in the art. The exemplary storage medium can be connected to the processor, and, as a result, the processor can read information from the storage medium and record the information on the storage medium. Alternatively, the storage medium can be incorporated in the processor. The processor and the storage medium can be included in an ASIC. The ASIC can be included in the user terminal device. Alternately, the processor and the storage medium can be included as separate components in the user terminal device.

Although the present invention is explained in detail by referring to preferred embodiments, the present invention is not restricted to these embodiments; and it is to be understood that the technical scope of the present invention encompasses the range in which any person with an ordinary skill in the art can readily modify or change the embodiments without departing from the subject matter of the present invention defined in the appended claims.

INDUSTRIAL APPLICABILITY

According to a method of generating voice based playback information and a recording medium for storing instructions for executing the method, a voice playback file for outputting voice is converted to playback information, and the voice playback file is played back to output the voice when the playback information is recognized. Therefore, the limit of the prior art is overcome, the device to which the invention applies can be marketed with competitive power, and the device can be apparently practiced, which guarantees the industrial applicability of the present invention.

The invention claimed is:

1. A method of generating voice based playback information, the method comprising:
receiving, by a generating hardware computing device comprising at least one processor executing specific computer-executable instructions within a tangible non-transitory memory coupled with the at least one processor, from a client hardware computing device coupled to the generating hardware computing device, user input including identification of an electronic audio file;
converting, by the generating hardware computing device, an acoustic data and a multimedia data accompanying the acoustic data from the electronic audio file to an encoded playback data including values of the acoustic data in said encoded playback data;
generating, by the generating hardware computing device, from the electronic audio file, the encoded playback data encoding a set of software instruction data that, when executed, plays back the electronic audio file;
creating, by the generating hardware computing device, from said encoded playback data, a bar code image for a first electronic document, wherein creating the bar code image comprises including, in the bar code image, at least one image value of said multimedia data; and data values that identify at least one of:
a plurality of colors, and
a plurality of figures corresponding to said multimedia data,
transforming, by the generating hardware computing device, an electronic document to form a transformed electronic document by inserting the encoded playback data into a head of the electronic document; and
encoding, by the generating hardware computing device, a barcode storing the encoded playback data.

2. The method of claim 1, wherein said converting said acoustic data and multimedia data includes amending a first document with a complementary information to form an amended first document, said complementary information containing data values identifying at least one of said acoustic data and said multimedia data.

3. A method of recognizing voice based playback information, the method comprising:
receiving, by a recognizing hardware computing device comprising at least one processor executing specific computer-executable instructions within a tangible non-transitory memory coupled with the at least one processor, from a client hardware computing device coupled to the recognizing hardware computing device, an input comprising an encoded playback data encoding a set of software instruction data that when executed plays back an electronic audio file, the encoded playback data being inserted within:
a head of an electronic document; or
a bar code within a printout of the electronic document and storing the encoded playback data;
decoding, by the recognizing hardware computing device, the encoded playback data;
outputting, by the recognizing hardware computer device, the electronic audio file,
identifying the encoded playback data in a bar code image, the bar code image forming part of said electronic file,
extracting a multimedia data from the bar code image based on determining identifiers of at least one of (i) a plurality of colors and (ii) a plurality of figures, the identifiers contained in said bar code image;
based on a recognition of a presence of said encoded playback data, converting said playback data to extract a multimedia data therefrom; and
producing an optical signal that represents at least one of a text and an optical image associated with a voice.

4. The method of claim 3, further comprising identifying said encoded playback data in at least one of a header and the bar code image contained in said electronic document.

5. A method for generating and playing back voice-based information, the method comprising:
  receiving, by a generating hardware computing device comprising at least one processor executing specific computer-executable instructions within a tangible non-transitory memory coupled with the at least one processor, from a client hardware computing device coupled to the generating hardware computing device, user input including identification of an electronic audio file;
  generating, by the generating hardware computing device, from the electronic audio file and a multimedia data file accompanying the electronic audio file, the encoded playback data encoding a set of software instruction data that, when executed, plays back the electronic audio file;
  inserting, by the generating hardware computing device, the encoded playback data into a head of the electronic document;
  encoding, by the generating hardware computing device, a bar code storing the encoded playback data, wherein the bar code includes
    at least one image value of said multimedia data and
    data values that identify at least one of a plurality of colors and a plurality of figures corresponding to said multimedia data;
  receiving, by a recognizing hardware computing device, an input comprising an encoded playback data within:
    the head of the electronic document; or
    the bar code within a printout of the electronic document;
  decoding, by the recognizing hardware computing device, the encoded playback data;
  outputting, by the recognizing hardware computing device, the electronic audio file.

6. The method of claim 5, further comprising:
  upon receiving an acoustic data at the input of the generating hardware computing device, transforming a multimedia data accompanying said acoustic data into said encoded playback data,
  wherein the multimedia data represents at least one of a text and an optical image associated with said acoustic data,
  upon receiving a transformed electronic document at the input of a second decide, extracting said multimedia data from said encoded playback data identified by a second device in said at least one of a header and bar code image of the transformed electronic document; and
  converting the multimedia data into an optical signal, generated at the output of the system and visually perceived as said at least one of text and optical image.

* * * * *